(12) United States Patent  
Saylor, Jr.

(10) Patent No.: US 8,905,174 B2
(45) Date of Patent: Dec. 9, 2014

(54) TRACTION ROBOT

(71) Applicant: Edward T. Saylor, Jr., Vero Beach, FL (US)

(72) Inventor: Edward T. Saylor, Jr., Vero Beach, FL (US)

( * ) Notice: Subject to any disclaimer, the term of this patent is extended or adjusted under 35 U.S.C. 154(b) by 0 days.

(21) Appl. No.: 14/199,554

(22) Filed: Mar. 6, 2014

(65) Prior Publication Data

US 2014/0299397 A1 Oct. 9, 2014

Related U.S. Application Data

(63) Continuation-in-part of application No. 13/964,907, filed on Aug. 12, 2013, now abandoned, which is a continuation-in-part of application No. 13/540,238, filed on Jul. 2, 2012, now Pat. No. 8,505,663, which is a continuation of application No. 12/846,505, filed on Jul. 29, 2010, now Pat. No. 8,210,303.

(60) Provisional application No. 61/229,704, filed on Jul. 29, 2009.

(51) Int. Cl.
B62D 57/024 (2006.01)
B62D 55/265 (2006.01)

(52) U.S. Cl.
CPC .................................. B62D 55/265 (2013.01)
USPC ............................ 180/164; 180/9.1; 180/9.64

(58) Field of Classification Search
USPC ......................................... 180/164, 9.1, 9.64
IPC ........................................ B62D 55/265,57/024
See application file for complete search history.

(56) References Cited

U.S. PATENT DOCUMENTS

| | | |
|---|---|---|
| 3,991,842 A | 11/1976 | Larsen |
| 4,664,212 A | 5/1987 | Nagatsuka et al. |
| 5,194,032 A | 3/1993 | Garfinkel |
| 5,366,038 A | 11/1994 | Hidetsugu et al. |
| 5,487,440 A | 1/1996 | Seemann |
| 6,090,221 A | 7/2000 | Gan et al. |
| 6,099,091 A | 8/2000 | Campbell |
| 6,102,145 A | 8/2000 | Fisher |
| 6,964,312 B2 | 11/2005 | Maggio |
| 7,404,464 B2 | 7/2008 | Imus et al. |
| 7,775,312 B2 | 8/2010 | Maggio |
| 8,215,435 B2 | 7/2012 | Dvorak |
| 2005/0072612 A1 | 4/2005 | Maggio |
| 2006/0278454 A1 | 12/2006 | Maggio |

Primary Examiner — Kevin Hurley
(74) Attorney, Agent, or Firm — Mattingly & Malur, PC

(57) ABSTRACT

A traction unit has carrier sections on which suction cups are mounted that are connected to a vacuum source. The carrier units are driven around the frame by a chain driven by a motor. The frame has sections which move relative to one another in order to permit turning control of the traction unit.

9 Claims, 17 Drawing Sheets

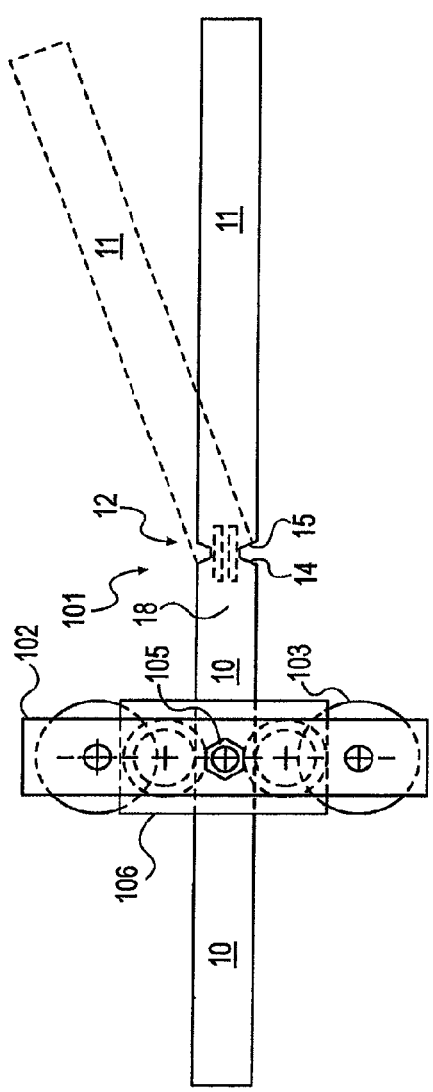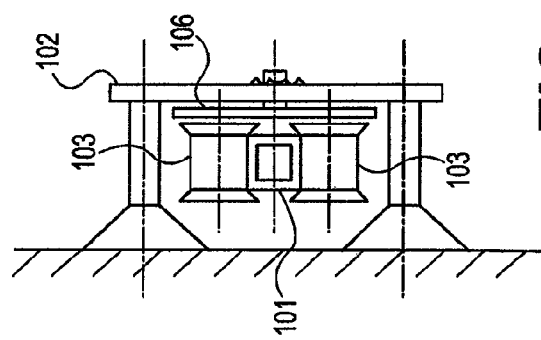

TRACTION ROBOT

CROSS REFERENCES TO RELATED APPLICATIONS

This application is a continuation-in-part of U.S. patent application Ser. No. 13/964,907, filed Aug. 12, 2013, which is a continuation-in-part of U.S. patent application Ser. No. 13/540,238, filed Jul. 2, 2012, now U.S. Pat. No. 8,505,663, which is a continuation-in-part of U.S. patent application Ser. No. 12/846,505, filed Jul. 29, 2010, now U.S. Pat. No. 8,210,303, the entire disclosure of which is incorporated herein by reference, and claims the benefit of U.S. Provisional Patent Application No. 61/229,704, filed Jul. 29, 2009 to the same inventor as herein, the entire disclosure of which is incorporated herein by reference.

BACKGROUND OF THE INVENTION

1. Field of the Invention

The present invention relates to a remote control device or self controlled robotic device used for traversing an apparatus for working on a surface while adhering to the surface through suctions cups or pads.

2. Description of Related Art

Remote controlled devices and robots are used in remote, hazardous or difficult to reach areas in which operations are performed. The traction device for such robots and remote control devices enables climbing a vertical wall or traversing a ceiling. Such devices are useful in non-destructive testing and of interest in the aircraft industry, in particular.

U.S. Pat. No. 7,404,464 to Imus et al discloses a traction device having a continuous traction belt provided on a pair of opposing rollers in which the traction belt includes openings such that a vacuum may be applied through the traction belt enabling the apparatus to cling to a working surface.

U.S. Pat. No. 6,742,617 discloses a traction unit that is able to traverse compound curves and surfaces having suction cups that enable the apparatus to adhere and release from the surface as the traction unit moves across a surface.

SUMMARY OF THE INVENTION

According to embodiments of the invention, a traction device has suction pads instead of or in addition to suction cups that enable the device to adhere to a smooth surface and/or an irregular surface on which it traverses supported by carriers that traverse a frame. Suction is applied to the cups or pads to enable the cups or pads to engage the smooth or irregular surface to provide the resulting adhesion. Suction is applied to the cups or pads to enable the cups to engage the surface to provide the resulting adhesion.

According to embodiments of the invention, the frame on which suction cups or pads are supported and move around is articulated and can be adjusted to change direction of the traction device as the traction device moves across the surface to which the suction cups or pads adhere.

According to embodiments of the invention, a traction unit is capable of traversing a surface at a controlled rate and turning by remote control on surfaces that include compound curves, vertical walls and ceilings. By mounting a working apparatus that performs sanding, buffing, paint removal, drilling or non-destructive testing equipment, the work surface can be traversed by the traction unit and work accomplished by remote control or robotically.

According to embodiments of the invention, the frame for holding the suction cups or pads is comprised of sections flexibly connected to one another to enable the sections of the traction unit to move with respect to one another for traversing a work surface in a straight line or at angles thereto in order to make turns in accordance with adjustments made between adjacent sections in the connection angle between therebetween for ensuring versatile movement of the traction unit in different directions along its path of travel.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 is a top view of one part of a traction unit as shown in FIG. 1.

FIG. 3 is a side view of the carrier shown in FIG. 2 according to the embodiment of the invention shown in FIG. 1.

DETAILED DESCRIPTION OF THE INVENTION

Figure 1:
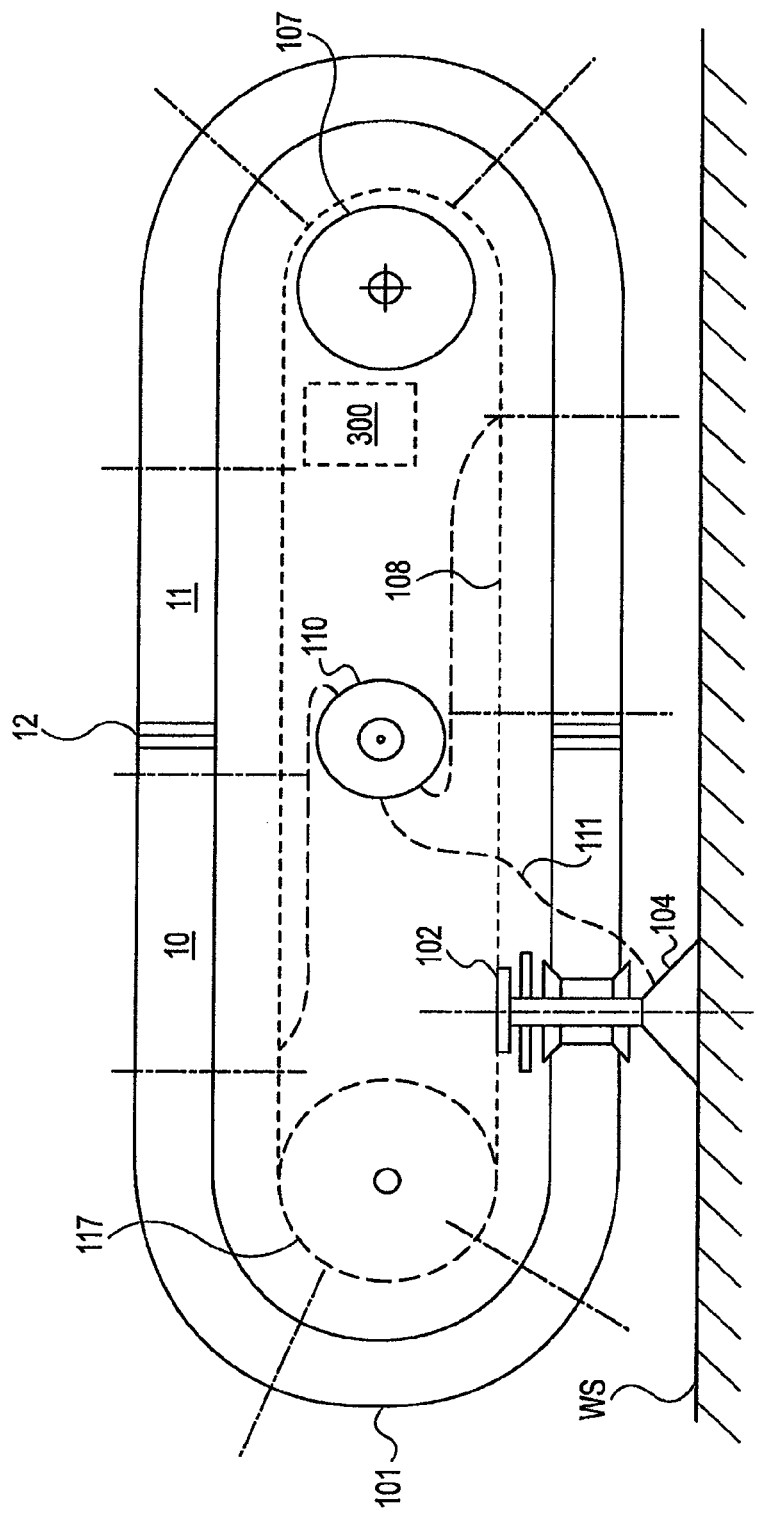
FIG. 1 is a side view of a traction unit according to a first embodiment of the invention shown schematically.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

A traction unit according to one embodiment of the invention as shown schematically in side view in FIG. 1. The traction unit has a frame 101 of a shape, such as an oval shape, as shown in the figure. The frame is preferably of tubular construction having a rectangular cross-sectional shape as shown in FIG. 3, for example. A plurality of carriers 102, only one of which is shown for brevity, are mounted to move around the frame 101 and are spaced equidistantly around the frame as indicated schematically. The carriers 102 are, as shown in FIG. 3, provided with rollers 103 that engage frame 101 to move along frame 101. A chain 108 (shown schematically) is driven by a motor 107 at one end of the traction unit and supported by a sprocket 117 at the other end of the traction unit. The carrier 102 has a mounting connection to the chain 108 of a conventional type which enables the carrier 102 to be driven around the frame 101.

As shown in FIG. 1 the traction unit has a control unit 300 onboard, for example on the work platform or mounted internally, optionally with a microprocessor and with communication capability to a remote control to enable control of the traction unit by manipulating the speed of motor 107 and positioning of hydraulic actuators 18 to which the control unit is connected. Alternatively, control unit 300 has a program for commanding control of motor 107 and actuators 18 to traverse a programmed path. Feedback with respect to image or position and orientation (through accelerometers, a GPS system or localized position control system, for example) can also be used for input parameters to the control unit to ensure movement along the desired path.

Each carrier 102 has guide suction cups 104 that engage a work surface WS and are connected to a vacuum source 110 through a vacuum hose 111 (shown schematically) with the understanding that each of the carriers has a shared or separate suction hose connected to the suction cups. Further, the vacuum source is a vacuum pump self-contained within the traction unit or is a vacuum distributor which receives vacuum from a hose connected to a source of vacuum remotely from the traction unit. Further, the vacuum source is a vacuum pump self contained in the traction unit powered by compressed air. Further, compressed air can come into each of the carriers equipped with a venturi vacuum generator.

The frame 101 is comprised of sections 10 and 11 that are hinged or otherwise flexibly connected to each other at connection points 12 as shown in FIGS. 1 and 2 with respect to one such connection. Frame sections 10 and 11 have angled or tapered ends 14 and 15, respectively to enable relative positioning between the frame section members without interference. The positioning of the frame members with respect to one another can be accomplished through suitable drive mechanisms, such as hydraulically actuated cylinders, driven pneumatically, 18, which are shown in the figure to be a pair of cylinders. When one cylinder contracts and the other cylinder expands, the frame section member 11 is able to move with respect to the position shown in dashed lines in FIG. 2 to be positioned at an angle with respect to frame section member 10. In this manner, the suction cup carrier 102 which moves along the frame 101 is positioned to turn the traction unit in one direction or another.

Figure 6:
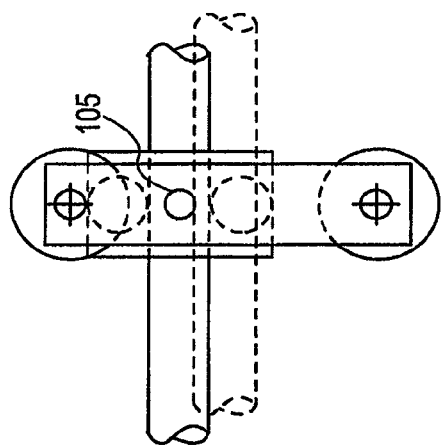
FIG. 6 is a view showing the displacement or direction change that is achieved by the adjustment in angle made between adjacent sections as shown in FIG. 5.
Figure 5:
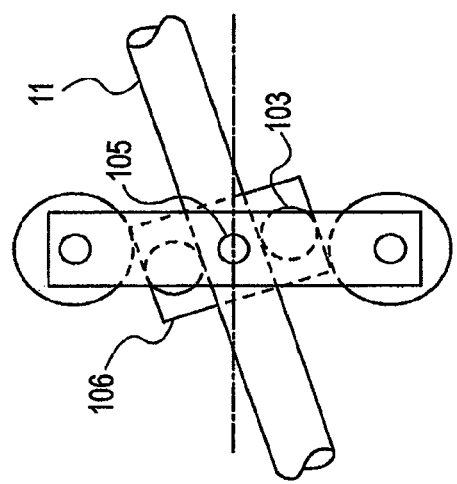
FIG. 5 is a view similar to FIG. 4 showing the section of one frame section pivoted to one side to show turning movement of the traction unit.
Figure 4:
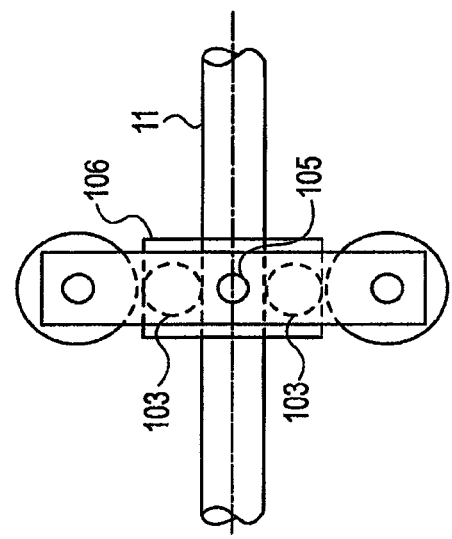
FIG. 4 is a schematic view of the positioning of the carrier with respect to the suction cups supported on a frame member with a traction unit of FIG. 1 traveling in a straight line direction.

FIGS. 4-6 show the adjustment made in the direction of movement of the traction unit schematically when positioning of a frame section 11 with respect to a frame section 10. In FIG. 4, frame section 11 is shown in a position shown by solid lines in FIG. 2. In FIG. 5, the frame section 11 is moved to the position shown by dashed lines in FIG. 2. As a result, the carrier 102, through the engagement of rollers 103 on the frame section member 11 of frame 101, changes its orientation such that forward movement along the frame section 11 results in displacement of the traction unit to a position shown in FIG. 6.

The movement of frame 11 not only turns but can move sideways from dotted line to solid line as shown in FIG. 6. This is accomplished by slotting the support bracket 102 to allow pin 105 to move and carry frame 11 to one side. This movement can be controlled by spring loading or cylinder (pneumatic or hydraulic). Another solution is a member can be connected by pin 105 then adjoined to ride in a slotted support bracket 102.

As shown in FIG. 3, a support bracket 106 supports the rollers 103 and is pivoted by a connection 105 which may be a pivot pin, threaded connector, rivet and the like, to carrier 102. The pivoted connection enables the support bracket 106 to pivot as shown in FIGS. 4-6, for example.

FIGS. 7(a)-7(e) show the range of motion which the traction unit is able to move by making adjustments between the frame section members. Further, although only one connection between sections of frame 101 is shown in FIGS. 1 and 2, it is understood that frame 101 may comprise several sections including three or more sections, three of which are shown in FIGS. 7(a)-7(e).

Figure 7A:
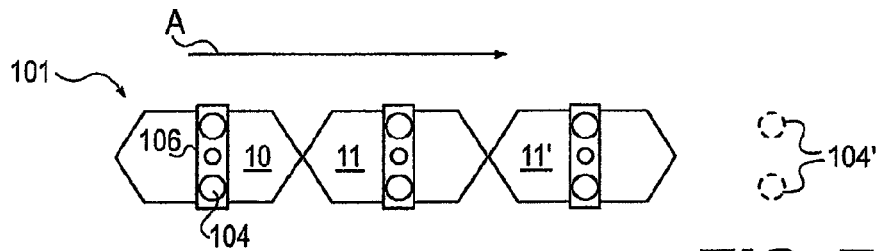
FIGS. 7(a)-7(e) show the position of the support bracket with respect to the suction cups during straight line movement and during positioning according to an embodiment of the invention.
Figure 7B:
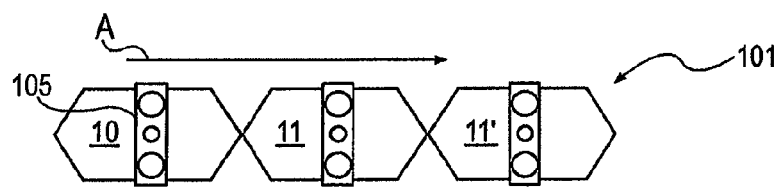

As shown in FIG. 7(a), the linked together sections 10, 11, 11' are able to shift with respect to one another with the resulting repositioning of the suction cups 104 carried by the carrier 102 as a result of the pivot pin 105 permitting relative movement between the support bracket 106 and the carrier 102.

Figure 7C:
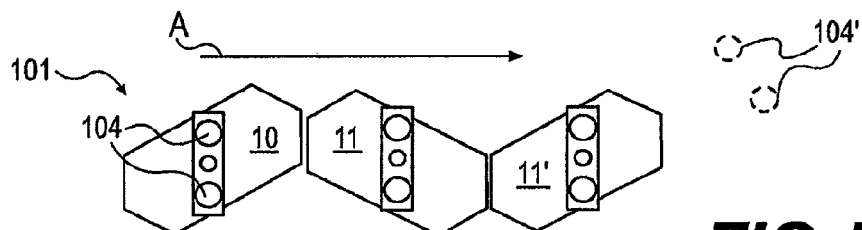
Figure 7D:
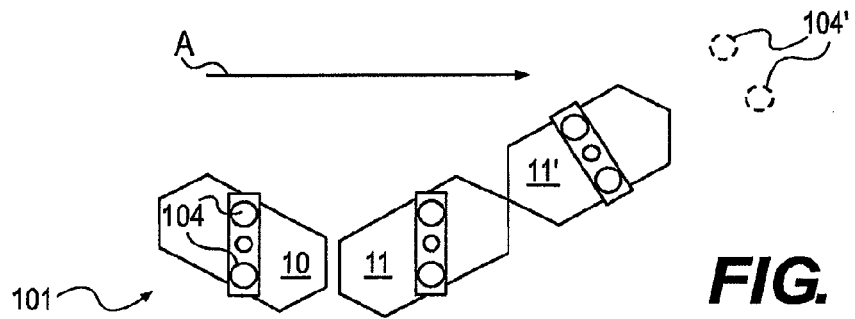
Figure 7E:
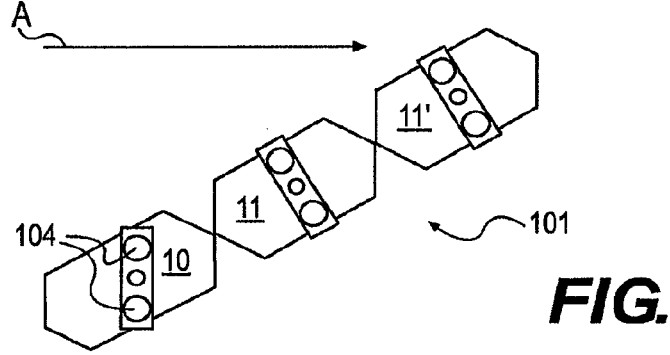

As shown, the positioning of the suction cups 104' is the same as FIG. 7(a) with respect to the initial position of suction cups 104 and is different in FIGS. 7(c) and 7(d) from the initial position of the suction cups. Accordingly, the articulation between the sections of the frame 101 enables movement of the traction unit as the traction unit traverses the work surface to a varying degree depending on the positioning of adjacent frame sections. FIG. 7(e) shows a result of an adjustment made between adjacent sections such that the traction unit proceeds at an angle shifted with respect to the direction of movement shown in FIG. 7(a) (arrow A in FIG. 7(a)).

Figure 8:
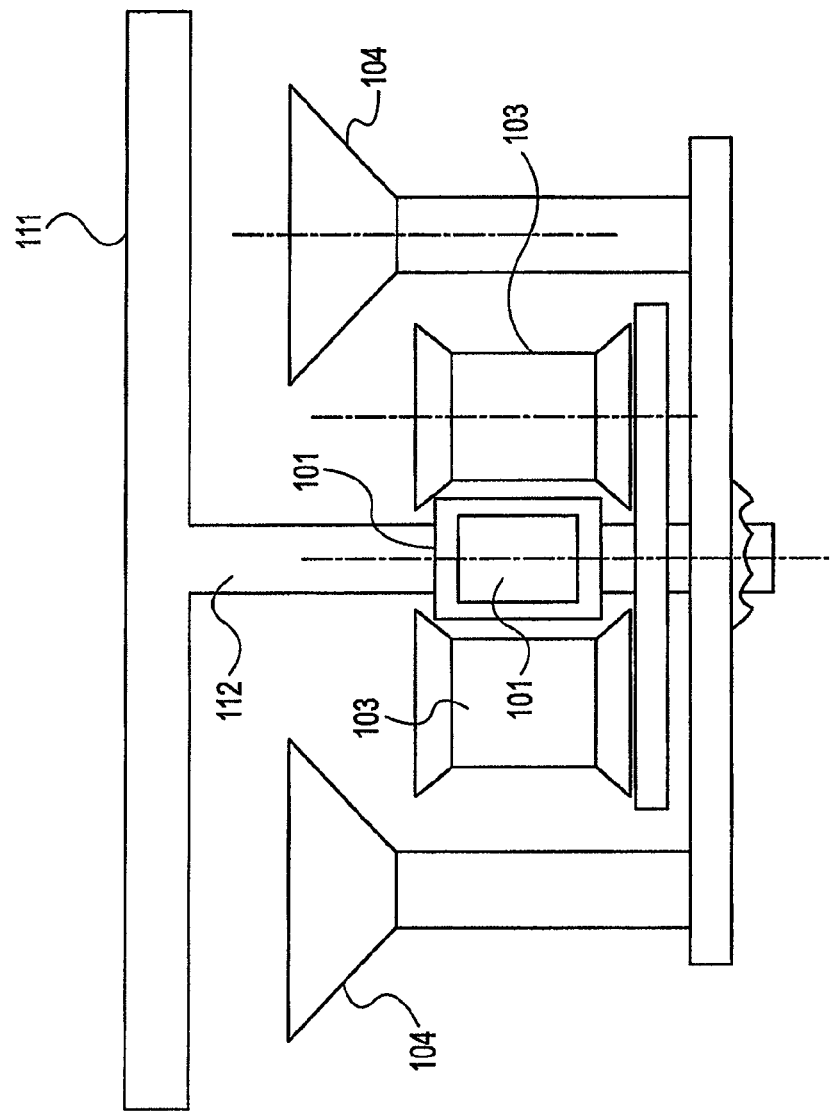
FIG. 8 shows a modification to the embodiment of the invention in which a platform supporting a work implement is attached to the frame for on a traction unit according to one embodiment of the invention.

FIG. 8 shows a detail of a support platform or base 111 for a working implement which is moved by the traction unit that is connected by a strut 112 to frame member 101. Support or base platform 111 enables the traction unit to move a device useful in working on surface WS to perform remotely controlled or self-controlled robotic operations such as grinding, sanding, paint removal, drilling, or non-destructive testing or painting on the surface of work, such as the skin of an aircraft. Further, for aircraft having a wing or a fuselage that extends in all directions vertical and horizontal and curved, the traction unit moves along these curved surfaces and provides a stable platform 111 on which work apparatus can be mounted for working on the work surface as the traction unit traverses the work surface. The platform is also suitable for the mounting of the control equipment that communicates remotely with the operator or that houses the microprocessor controller that operates and controls adjustments of the movements of the motor 107 and cylinders 18.

Figure 9:
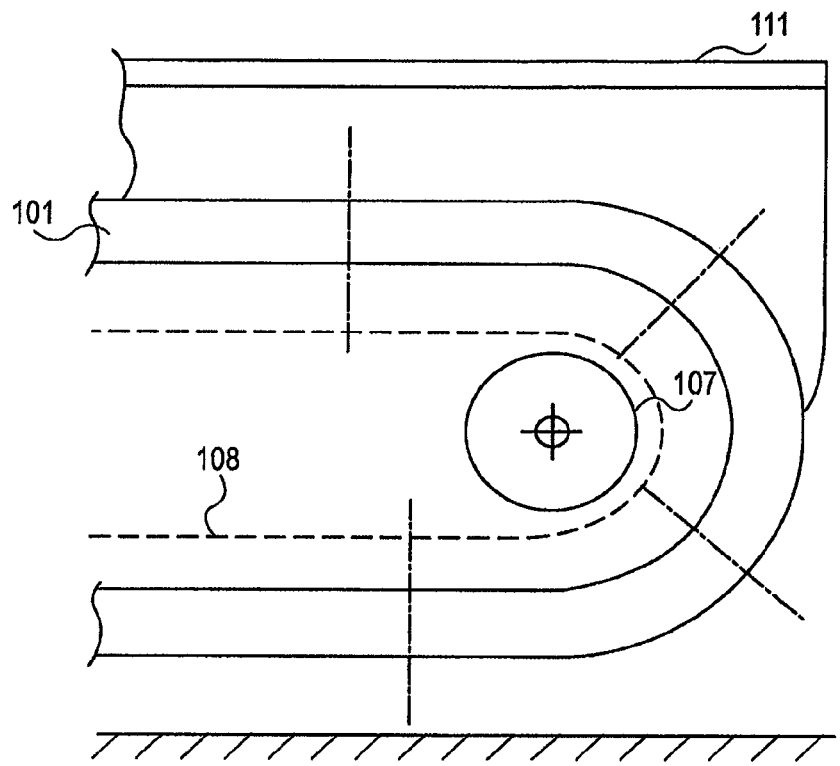
FIG. 9 shows another view of the base for a work implement as shown in FIG. 8.
Figure 10:
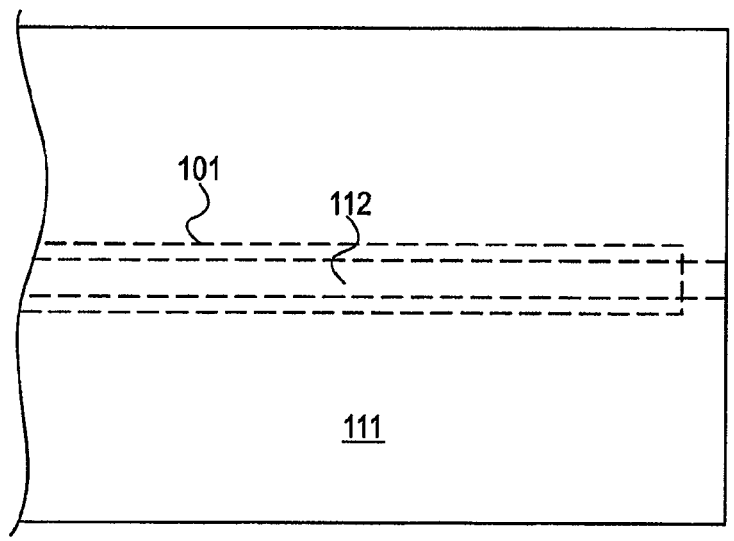
FIG. 10 shows a top view of the base for a work implement as shown in FIG. 8.

FIG. 9 shows the work platform or base 111 in side view mounted on a traction unit according to the embodiment of the invention shown in FIG. 1. FIG. 10 shows a top view of a portion of the work platform or base 111 shown in FIGS. 8 and 9.

Figure 11:
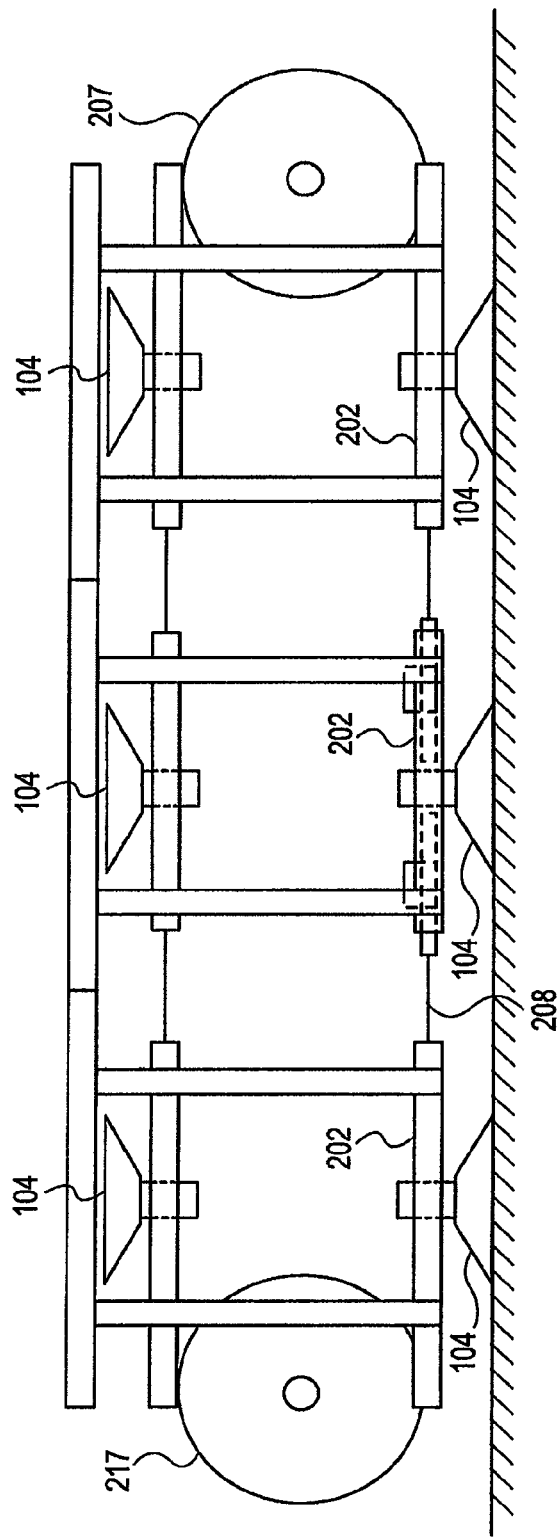
FIG. 11 shows a side view of another embodiment of the traction unit according to the invention.
Figure 12:
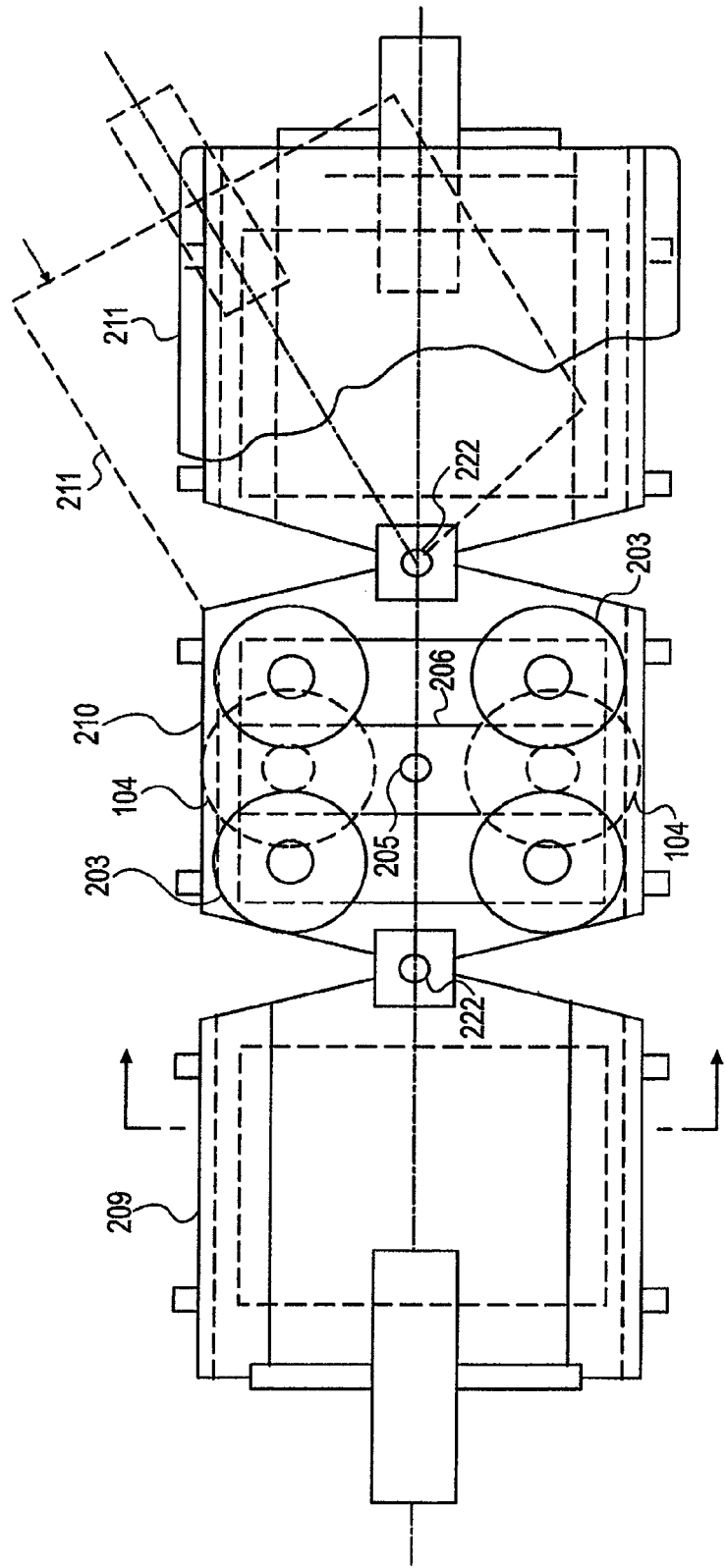
FIG. 12 shows a top view of the embodiment of the invention shown in FIG. 11.
Figure 13:
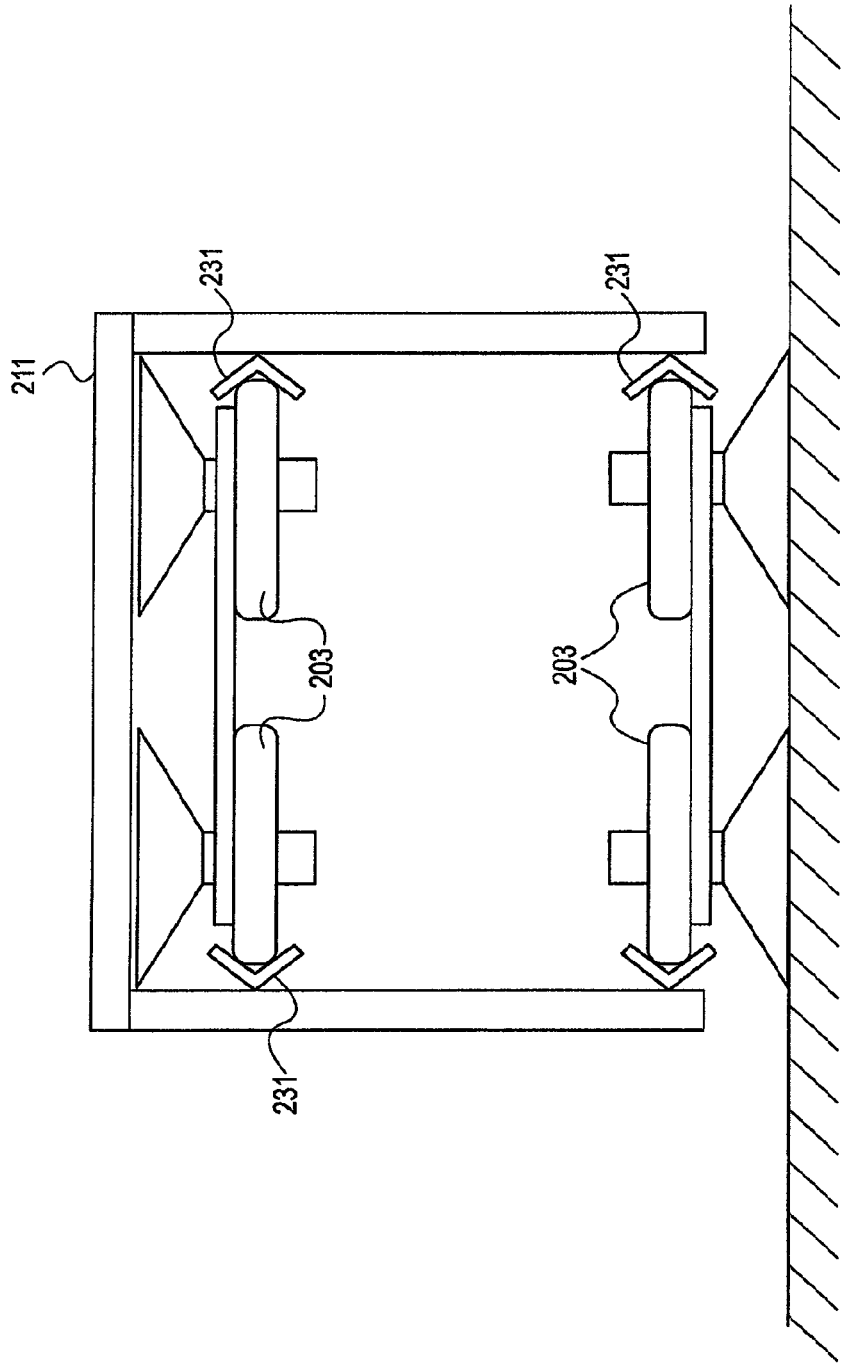
FIG. 13 shows a schematic side view of a section of the support frame of the traction unit shown in FIG. 11.
Figure 14A:
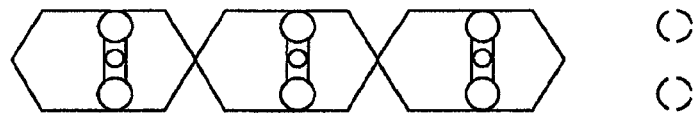
FIGS. 14(a)-14(e) show schematically the positioning of each section of a traction unit in straight line movement and in movement which turns from straight line movement.
Figure 14B:
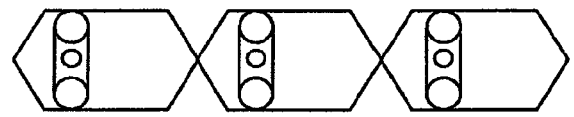
Figure 14C:
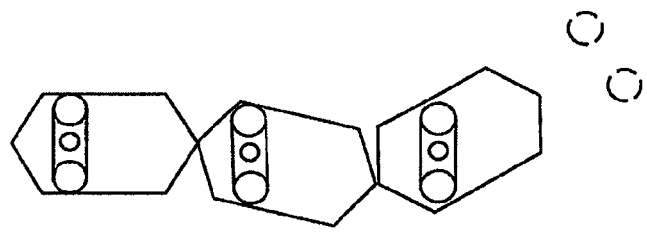
Figure 14D:
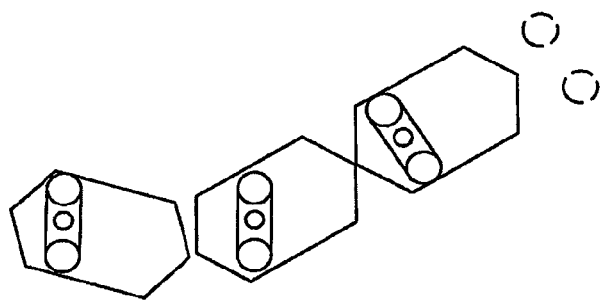
Figure 14E:
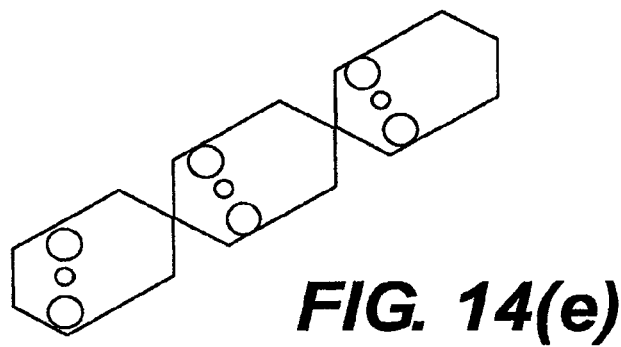

FIG. 11 shows a traction unit according to another embodiment of the present invention. The figure shows a traction unit having vacuum cups 104 mounted on carriers 202 that are connected together by a cable 208 driven by a motor through pulleys 207 and 217. As shown in FIG. 13, the traction unit has a platform or base 211 on which are mounted guide tracks or angle rails 231. The carriers 202 have rollers 203 that engage the angle rails 231 so that as the cable 208 pulls the carriers 202 around the rail tracks, the rollers engage the rails and advance the platform or base 211 with respect to the suction cups 204. As shown in FIG. 12, the sections 209, 210 and 211 of the traction unit are pinned together or pivotally connected to one another at 222 to permit articulated movement of adjacent sections 209, 210 and 211. In an arrangement similar to the first embodiment, a support bracket 206 is pinned to the carrier 202 by a pin or suitable pivoting connection 205 which allows for relative movement. As shown in FIG. 12, when the section 211 is shifted by a positioning device such as a hydraulic cylinder that is pneumatically operated, for example, (not shown) the section 211 is moved without shifting of the vacuum suction cups. Further, FIGS. 14(*a*)-14(*e*) show movement of the adjacent sections 209, 210 and 211 in a manner similar to that as shown in FIGS. 7(*a*)-7(*e*), and therefore further description of the figures is believed unnecessary.

Figure 15A:
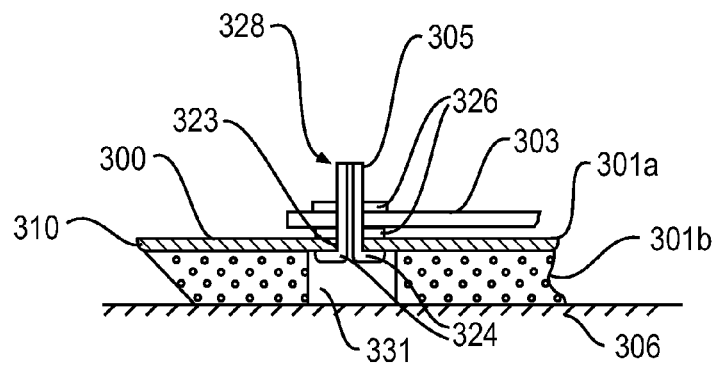
FIGS. 15(a)-(b) show a perspective view of a suction pad according to embodiments of the invention and a partial sectional view of the suction pad, respectively.
Figure 15B:
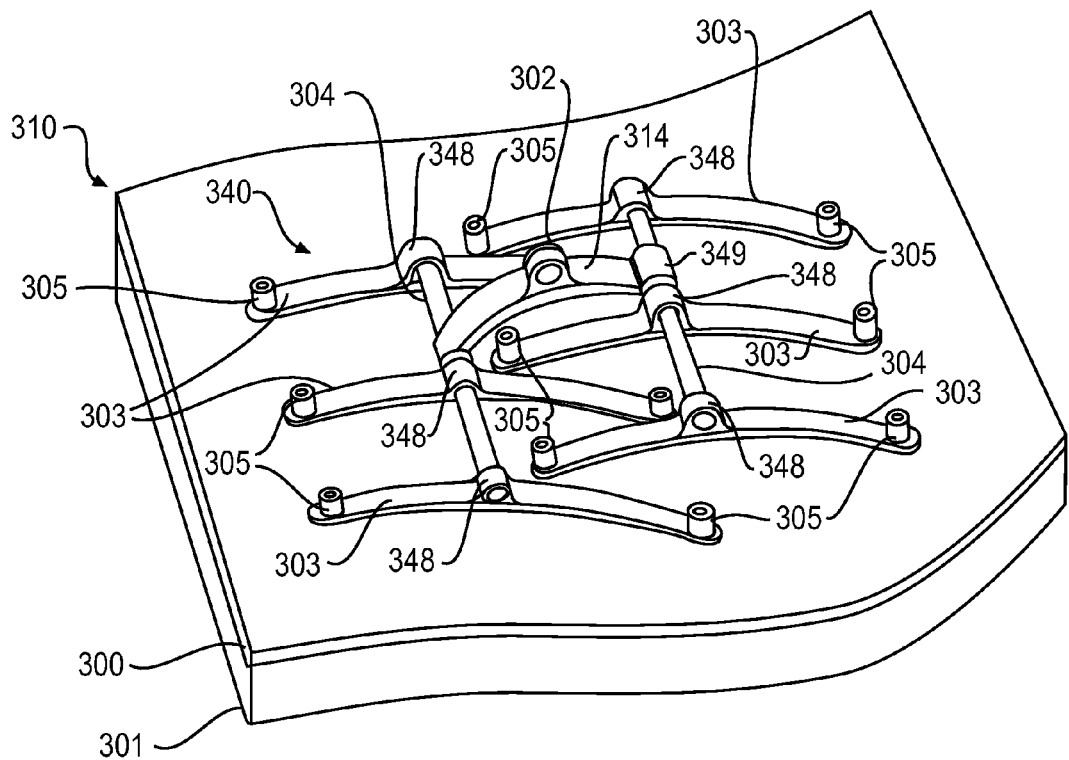

FIG. 15(*a*) shows a perspective view of a suction pad that is suitable for use interchangeably with suction cups 104. The suction pad 310 may be comprised of a tough flexible sheet such as a composite of glass and urethane 300 that is cemented or otherwise adhered to a soft or pliant, closed cell foamed material 301 that is also flexible. The pad is held by a frame member of carrier 102, such as a shaft, which passes through sleeve 302. The frame member 312 is in turn connected connecting rods or shafts 304 that support each of the individual support members 303 through shaft and sleeve or otherwise freely moveable bearing connections 314.

As shown in FIGS. 15(*a*) and 15(*b*), the support members 303 are connected to the pad 310 via a nozzle 305 passing through a top sheet 300 of the pad and a through bore 323 of the support arm 303. The nozzle may be metal or plastic and fit into place to secure the member 303 to the pad 300 through a compression fit or suitable threaded connection. The tip of the nozzle is connected to a vacuum hose compatible with vacuum hose 111 shown in FIG. 1, for example. The vacuum is supplied to the cavity 331 and the pad 310, which may be a section of foam material 301 that is removed below the nozzle 305 as shown in FIG. 15(*a*).

Preferably the vacuum connection is a slip on fitting to be received by the nozzle 305 for applying a vacuum in the cavity of the vacuum pad. Since the pad is flexible and will compress the pliable foam material onto the surface 306, the area around the cavity will be sealed. Several cavities are provided within the pad, only one of which is shown in FIG. 15(*a*).

Further, the rocker arm arrangement of the frame permits the flexible pad to seal to adapt to irregularities of surface 306 to make a system that can seal and grip a rough and uneven surface, for example concrete wall.

As will be appreciated by those of ordinary skill in the art, the system permits the robot to traverse a rough and uneven surface by substituting the suctioned pads 310 for the suction cups 104 and by further providing suction hoses to each of the nozzles 305, and otherwise enabling the movement of the robot to be conducted in the same manner as disclosed with respect to the previously described embodiments.

Additionally, the pneumatic operating system which applies suction to the nozzles 305 of a suction pad can be replaced by a hydraulic system permitting the robot to operate under water. A water hose connected to an underwater robot can direct the water to a hydraulic designed venturi to produce a partial vacuum, which vacuum would then be distributed to appropriate hoses to the nozzles of the vacuum pad to provide underwater gripping of the pad.

For a surface of steel, additional gripping could be provided using magnets in place of or in addition to the suction pads 310 or suction cups 104 such that the electrical switching of the control of the magnet is cycled on and off through the movement of the carrier according to an operation similar to that required for providing suction to the suction cups.

Another embodiment of the present invention will be explained below. Benefits of the following embodiment include the ability to better adhere and traverse a rough surfaces e.g., a concrete wall. The traction unit can also travel over complex curved shapes such as by circling around the circumference of a tank, large pipe, etc. As a result of the configuration of the present embodiment, the unit is lighter in weight, more agile, and able to be controlled remotely.

Figure 16:
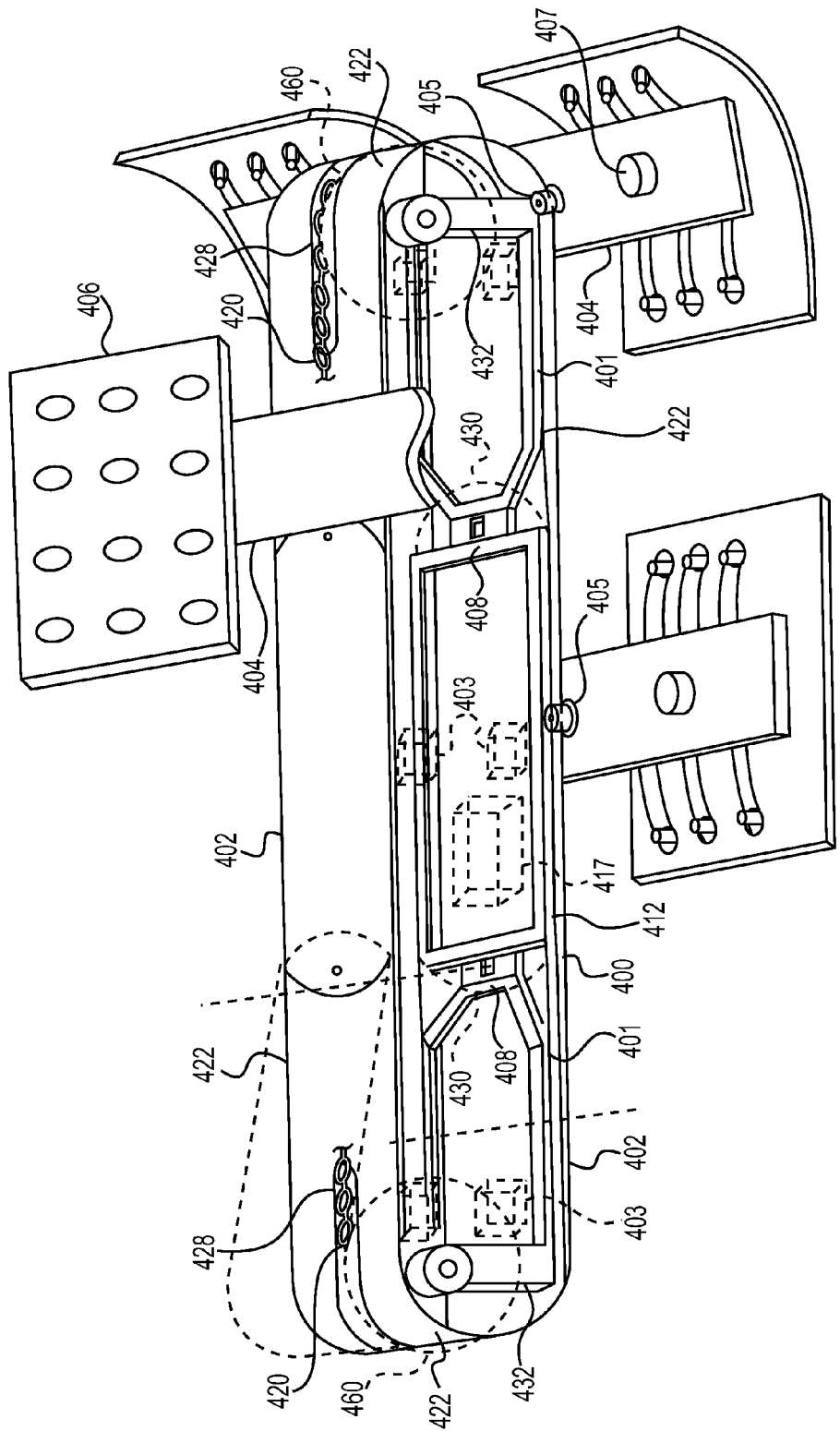
FIG. 16 shows a perspective view of a traction unit of another embodiment of the present invention.

As shown in FIG. 16, the robot is comprised of a main frame 400, which may be a tubular aluminum frame of rectangular shape, connected at each end to auxiliary frame sections 401, which may also constructed of a tubular aluminum frame and having a modified rectangular shape, i.e. a trapezoidal shape 430 at each end portion connected to the main frame through universal joints 408, which permit side-to-side and up and down relative movement. At the other end of each of the auxiliary frame members are upstanding posts that support drive sprockets (drive pulleys) 460.

Sheet metal guides 402, 422 are fabricated for each of the main and auxiliary frames 401, 400, respectively. The sheet metal guide 422 is of a generally c-shape and wraps around the end portion of the auxiliary frame 401 and is supported across the bottom by the generally rectangular shaped frame and at the ends through connection to the upstanding posts 432. The sheet metal guide 422 is also connected across the top through connection at the terminal ends to an adjacent upper sheet metal guide part 402 for the main frame. The main frame has a lower sheet metal guide part 412 that is connected to the main frame member 400.

Preferably, in a configuration as shown in FIG. 16, there are 9 suction pads provided (evenly spaced apart, but not all shown, for clarity). Suction pads 406 are mounted on c suction pad brackets 404, each having a guide roller 405 on each lateral side of the sheet metal guide for engaging the edges of the sheet metal guides as the suction pad brackets 404 are driven around the frame structure. The suction pads 406 are rotatably mounted on the brackets 404 by pin 407. The brackets 404 are driven by connection to a drive chain 420 that is driven by engagement with drive sprockets 460. The drive chain passes through a slot 428 in the sheet metal. As a result of the brackets being chained together and pulled by the end pulleys 460, the brackets 404 and suction pads 406 are driven around the frame members and guided by the sheet metal guides to provide for relative orientation of the frame members, including relative lateral movement between the main and auxiliary frame members, and up and down movement therebetween.

More main frames and/or auxiliary frames 400, 401, respectively, with corresponding sheet metal guide parts can be linked together to increase the length of the traction unit. Further, suction pads 406 may be added or removed as necessary. The flexible composite/foam construction of the pad permits them being bent around the end drive pulleys 460. It also has excellent molding and sealing characteristics required for adhesion as the multiple suction cavities traverse irregular surfaces. The sheet metal frames (auxiliary and main frames) provide a structure for the traction unit and allow for maneuverability in the lateral directions and displacement in vertical directions to allow for traversing surfaces which are curved or bumpy.

Examples of the chain drive include a bead chain, ball chain, flexible belt, and further includes, depending on the application, a cable, such as an aircraft cable. The chain drive engages with the end pulleys 460 through slots 428. In one embodiment, the chain is a bead chain which has swivel characteristics as a result of the spherical shape of the bead chain links. Bead chain drives, which may be included as part of the drive pulleys 460, have sprockets which provide a flexible, positive driving mechanism at low cost.

As stated above, each suction pad bracket 404 includes rolling pulleys 405, which engage the sheet metal guides 402. Accordingly, as the chain is driven, the suction pad brackets 404 connected to it move and are guided by the sheet metal guides 402. The rolling pulleys 405 and flexible chain allow for the suction pad brackets 404 to follow a course dictated by the front auxiliary frame, thereby providing maneuverability for the traction unit.

As the robot moves forward the best surface adhesion promotion is developed when the pad is correctly positioned over the surface. Optional equipment for better positioning would start with measuring the distance between the pad and surface, typically by a distance sensor 403. Many different types are available which includes, electronic and pneumatic means. The signals from the sensor 403 are then programmed to actuate one of two systems. One system would send a signal of the sensors 404 to energize actuators, located at the universal joint 408, to adjust angles between the frame and its auxiliary producing a curve thus shaping the guide with it. A second system to bend and form the guide would simply locate both sensors and actuators at each of the six points 403. The actuators can then move to satisfy the sensors input to in order for the guide to parallel the surface. The sensors 403 located on each frame may provide information such as distance to the work surface from the frame and surface characteristics (bumpy, curved, etc.).

The motor 417, either electric or pneumatic powered, is connected to the two drive pulleys 460 for either forward or backward motion. For turning motion the robot if traveling from right to left and turning to the right requires the auxiliary frame 401 swing right, dotted lines. This is remotely controlled and powered by an actuator located between the main and auxiliary frames.

Figure 17:
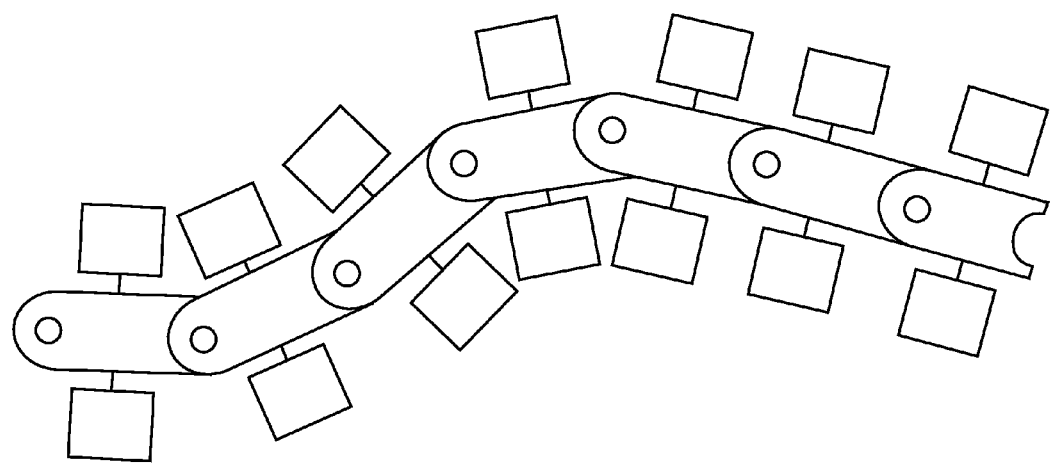
FIG. 17 shows schematically the positioning of each section of a traction unit in movement which turns from straight line movement.

In FIG. 17, the robot repeats itself for the formation of a millipede like structure. The advantages are an obvious increase in holding power for difficult surfaces since multiple ones of the bracket arms are stably secured to the surface on which the traction device is crawling, before the suction hold is released as a result of forward/reverse movement. The universal joints 408 will also enable the unit to bend up or over obstacles such steps or walls.

Figure 18:
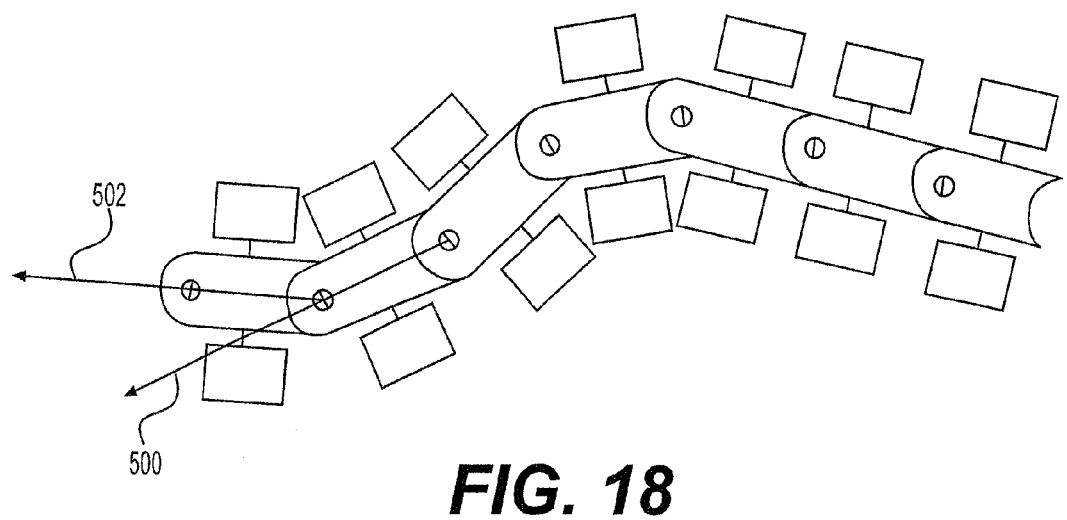
FIG. 18 shows the positioning of each section of a traction unit in movement when a lead section turns from heading in an initial direction to a new direction.

FIG. 18 shows the positioning of each section of a traction unit in movement when a lead section turns from heading in an initial direction to a new direction. As shown, the lead section is turned relative to the section behind it in the direction of the arrows shown, while the movement of the robot is travelling in a direction of right to left, for example. In this example, as the lead section (forward most section in direction of travel) is turned relative to the section behind it, the robot takes on a new direction of movement indicated by arrow 502. Arrow 500 indicates an initial direction of movement of the robot before the direction is changed by the lead section. Accordingly, as the robot moves in the travel direction, the robot may turn according to the turn direction of the lead section.

Figure 19:
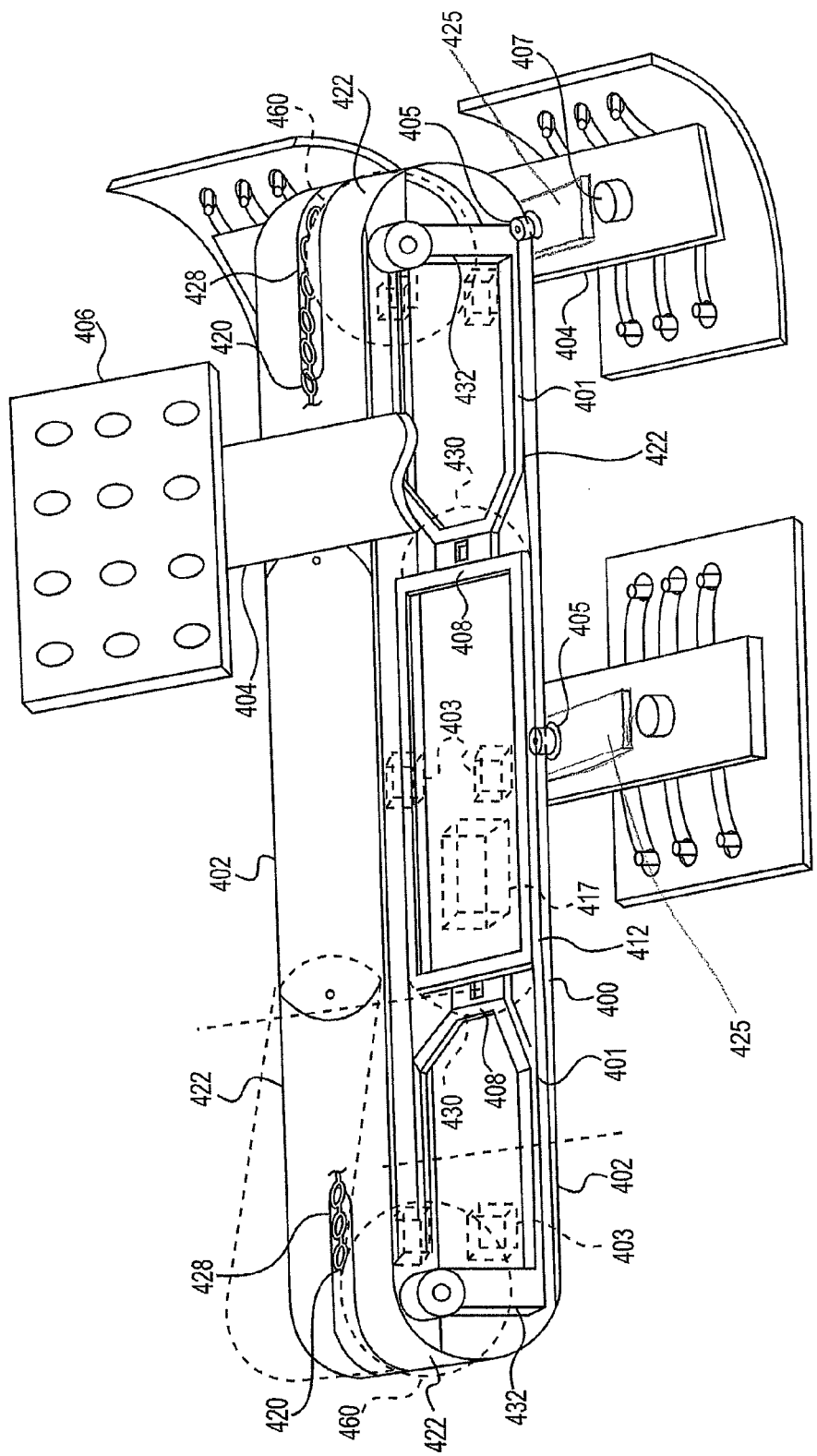
FIG. 19 shows a perspective view of a traction unit of another embodiment of the present invention.

FIG. 19 shows a perspective view of a traction unit of another embodiment of the present invention. FIG. 19 shows a traction unit similar to the one shown in FIG. 16. FIG. 19 shows bracket 425 mounted on top of suction pad brackets 404. Guide roller 405 is mounted on the bracket 425. Accordingly, the suction pads 406 are connected to the traction unit via suction pad brackets 404 and bracket 425. As better shown in FIG. 20, a swivel or pivot connection 333 is provided between the suction pad bracket 404 and bracket 425. The pivot connection is a mechanism, such as a rivet, that allows pivoting or swiveling. The structure of the suction pad bracket 404 and the bracket 425 connected by a pivot connection 333 allows the suction pad bracket 404 to swivel or pivot with respect to the bracket 425, which stays aligned with the sheet metal guides 402 of the traction unit. In other words, the guide rollers 405, which are mounted on the brackets 425, maintain alignment with the sheet metal guides 402 as a sheet metal guide 402 of one section is moved (displaced) with respect to sheet metal guide 402 of an adjacent section. Accordingly, the bracket 425 moves with the sheet metal guide 402.

Figure 20:
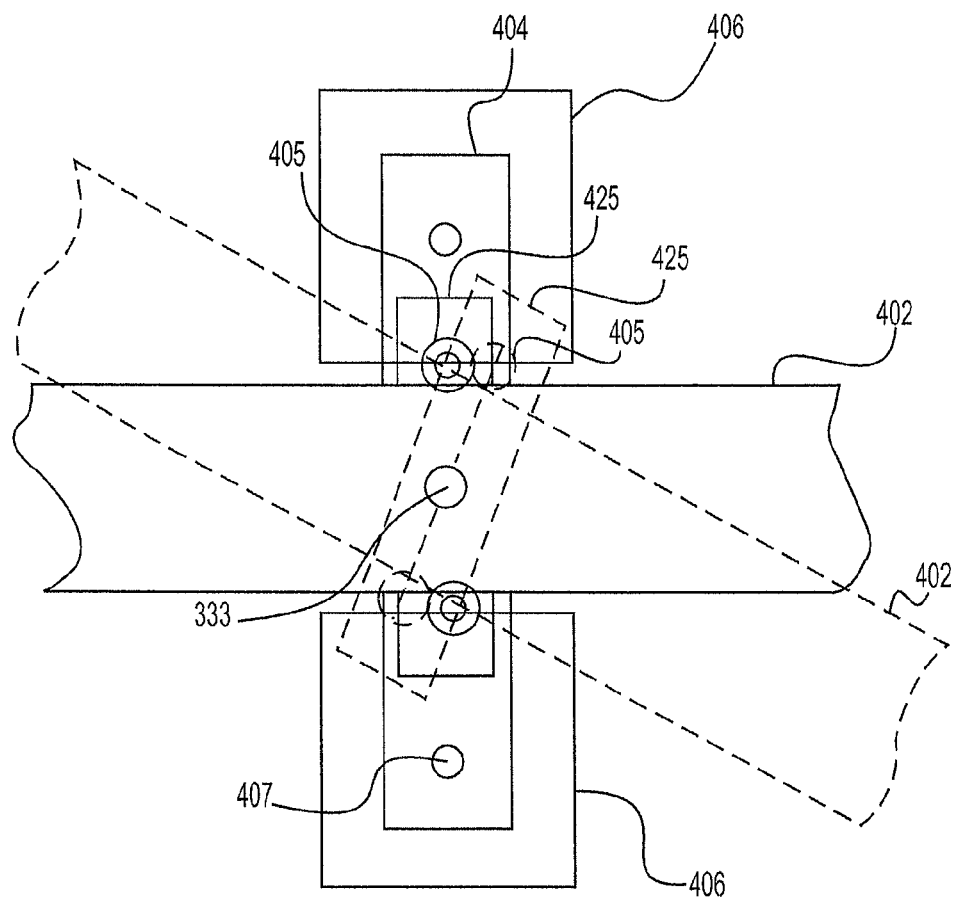
FIG. 20 shows the displacement of a sheet metal guide in dashed lines relative to an initial position of the same sheet metal guide (shown in solid lines).

FIG. 20 shows the displacement of a sheet metal guide 402 in dashed lines relative to an initial position of the sheet metal guide 402 (shown in solid lines). As shown, as the sheet metal guide 402 is displaced, the bracket 425 follows the sheet metal guide 402. As a result of the swivel or pivot connection between the bracket 425 and bracket 404, the suction pad bracket 404 maintains its position and therefore the suction pads 406 maintain their position and allow for the displacement of the sheet metal guide 402.

Figure 21:
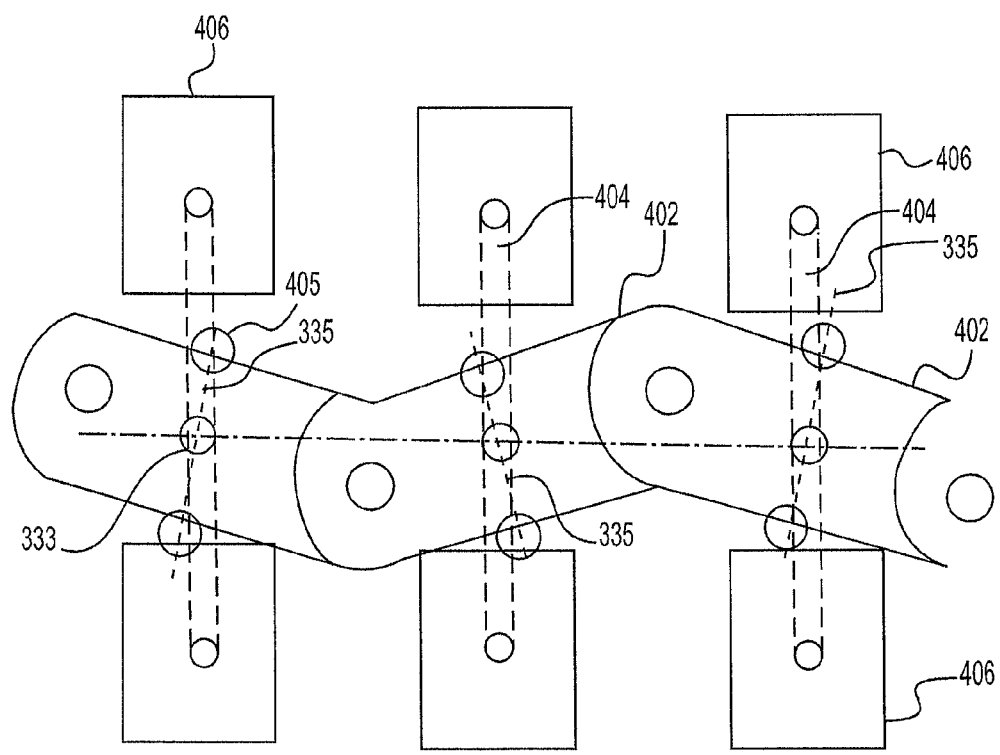
FIG. 21 shows the relative displacement of sections of the robot and the displacement of the suction pad bracket relative to a bracket as a result of the bracket pivoting on a pivot point.

Upon movement of the robot, each section is able to pivot about pivot point 333. Taking the lead section (left most section) of FIG. 21, for example, the lead section is angled relative to the adjacent section. Denoted at 335 is a reference line indicating the position of the bracket 425 and denoted at 404 is the position of the suction pad bracket 404. As shown in FIG. 21, as a lead section is turned, the reference line 335 representing the position of bracket 425, is displaced according to the degree of the turn. As such, the reference line 335 (bracket 425) is maintained in a position perpendicular to the direction of travel of the lead section. As shown in FIG. 21, the direction of travel is from the right to left with the lead section being at the left. As the lead section is turned, the pivot point 333 allows the suction pad bracket 404 to become displaced relative to being perpendicular to the direction of travel of the lead section. Further, the other sections are displaced accordingly as a result of the pivot points 333 on each bracket 425 and suction pad bracket 404 assembly and the flexibility of movement provided by the universal joints 408.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A traction unit comprising:
   a main frame and two auxiliary frames, the main frame positioned between the two auxiliary frames and connected via a universal joint for relative movement;
   a plurality of suction pads connected to the main and auxiliary frames via suction pad brackets, pins provide a rotatable connection for the suction pad to the pad brackets;
   one of a belt and a chain connecting the brackets for driving movement of the plurality of brackets around the main and auxiliary frames, the one of the belt and chain being driven by a motor.

2. The traction unit according to claim 1,
   wherein the movement of one auxiliary frame with respect to the main frame changes direction of movement of the traction unit by repositioning the auxiliary frame with respect to the main frame.

3. The traction unit according to claim 1,
   wherein the movement of the auxiliary frame relative to the main frame is adjusted by a hydraulic cylinder positioned at the universal joints.

4. The traction unit according to claim 1,
   wherein the traction unit is remotely operated by a control unit connected to the motor and connected to a hydraulic actuator for changing relative position between the auxiliary frame and the main frame.

5. The traction unit according to claim 1,
   wherein the traction unit is controlled independently by a program of an onboard microprocessor unit.

6. The traction unit according to claim 1,
   wherein the movement of the auxiliary frame relative to the main frame is adjusted by an actuator positioned at the universal joints.

7. The traction unit according to claim 1, wherein
   at least one suction pad is supplied with vacuum from a vacuum source, each of the suction pads having plural vacuum cavities open to a surface which the suction pad engages.

8. The traction unit according to claim 7, wherein
   each of the plurality of cavities of the suction pads has a nozzle applying vacuum suction from an opposite side to the surface contacting side;
   wherein the suction pad has an upper layer of a flexible sheet to which the nozzles are connected and a bottom layer of closed cell foam that is flexible to seal edges of each of the cavities when the suction pad engages a surface.

9. The traction unit according to claim 5,
   wherein a distance sensor measures the distance between a suction pad and the surface,
   the microprocessor unit is configured to control actuators positioned at the universal joints based on output from the distance sensor to adjust relative movement of the auxiliary frames to the main frame.

* * * * *